(12) United States Patent
White

(10) Patent No.: US 11,117,514 B2
(45) Date of Patent: Sep. 14, 2021

(54) MOTOR VEHICLE VISUAL AND AUDIO PROXIMITY WARNING SYSTEM

(71) Applicant: Heath White, Rushville, IL (US)

(72) Inventor: Heath White, Rushville, IL (US)

( * ) Notice: Subject to any disclaimer, the term of this patent is extended or adjusted under 35 U.S.C. 154(b) by 0 days.

(21) Appl. No.: 16/881,707

(22) Filed: May 22, 2020

(65) Prior Publication Data

US 2020/0384915 A1 Dec. 10, 2020

Related U.S. Application Data

(60) Provisional application No. 62/858,513, filed on Jun. 7, 2019.

(51) Int. Cl.
*B60Q 1/00* (2006.01)
*B60Q 5/00* (2006.01)
*B60Q 1/52* (2006.01)
*B60R 11/04* (2006.01)
*B60R 21/34* (2011.01)
*B60R 11/00* (2006.01)

(52) U.S. Cl.
CPC ............. *B60Q 5/006* (2013.01); *B60Q 1/525* (2013.01); *B60R 11/04* (2013.01); *B60R 21/34* (2013.01); *B60Q 2300/42* (2013.01); *B60R 2011/004* (2013.01)

(58) Field of Classification Search
CPC .... B60Q 5/006; B60Q 1/525; B60Q 2300/42; B60R 11/04; B60R 21/34; B60R 2011/004; B60R 1/2692; B60R 1/52; B60R 1/2657
See application file for complete search history.

(56) References Cited

U.S. PATENT DOCUMENTS

| | | | |
|---|---|---|---|
| 4,916,372 A | 4/1990 | Reavell et al. | |
| 5,132,662 A * | 7/1992 | Burch | B60Q 1/50 180/271 |
| 5,293,151 A * | 3/1994 | Rose | B60Q 1/50 116/28 R |
| 6,213,526 B1 | 4/2001 | Swanger et al. | |
| 6,234,105 B1 | 5/2001 | Lamparter | |
| 9,245,465 B1 | 1/2016 | Geyer et al. | |
| 9,616,806 B2 * | 4/2017 | Buley | B60Q 1/2661 |
| 10,486,592 B2 * | 11/2019 | Irby, Sr. | B60R 21/00 |
| 2003/0070603 A1 | 4/2003 | VanderMolen et al. | |
| 2004/0139907 A1 | 7/2004 | Haigh et al. | |
| 2007/0152803 A1* | 7/2007 | Huang | B60Q 1/525 340/435 |
| 2008/0157945 A1* | 7/2008 | Bowler | G08G 1/0175 340/433 |
| 2009/0273941 A1* | 11/2009 | Englander | B60Q 1/323 362/464 |
| 2012/0177336 A1* | 7/2012 | Bhan | H04N 5/85 386/224 |
| 2014/0306813 A1* | 10/2014 | Tabe | B60Q 5/00 340/425.5 |
| 2015/0158419 A1 | 6/2015 | Buley et al. | |

* cited by examiner

*Primary Examiner* — Toan N Pham

(57) ABSTRACT

A motor vehicle warning system for use with a stationary motor vehicle that informs on-coming traffic of the presence of the stationary motor vehicle and in turn alerts outside workers near the stationary motor vehicle that nearby on-coming traffic is approaching. The warning system includes a warning arm that extends away from the motor vehicle in use, lights on the warning arm to warn on-coming traffic of the stationary motor vehicle, and a siren that alerts workers outside of the motor vehicle of the presence of on-coming motor vehicles.

20 Claims, 4 Drawing Sheets

MOTOR VEHICLE VISUAL AND AUDIO PROXIMITY WARNING SYSTEM

RELATED APPLICATION

This application claims priority to and the benefit of my provisional patent application Ser. No. 62/858,513 filed Jun. 7, 2019 titled "A safety device for emergency vehicles, construction, utility, maintenance and any vehicles parked and/or working close to moving traffic, which detours traffic away and warns first responders and workers of danger.", and incorporated by reference as if fully set forth herein.

FIELD OF THE DISCLOSURE

The disclosure relates generally to a s motor vehicle visual and audio proximity warning system that acts to alert on-coming motor vehicles that a motor vehicle with workers present is stationary on or near the roadway, and to warn those workers of the presence of on-coming motor vehicles approaching the stationary motor vehicle.

BACKGROUND OF THE DISCLOSURE

Motor vehicles used for providing emergency services, such as those used by emergency medical technicians, fire and police personnel, and the like, as well as motor vehicles used for construction and road maintenance, such as those used by road construction workers, surveyors, utility crews, and the like are often parked on or near a roadway. Workers are often working near the parked motor vehicle and are exposed to on-coming traffic.

Motor vehicles that will typically park on or near the roadway during normal use are provided with emergency flashing lights or other visual warning display on the vehicle. The visual warning display alerts drivers of on-coming vehicles of the presence of the parked motor vehicle and to be alert to the presence of workers near the parked vehicle.

Although conventional visual warning displays are useful for alerting drivers of the presence of a parked emergency or construction vehicle ahead, there is room for improvement to reduce collisions with the parked vehicles and to further reduce the risk of workers being struck by on-coming traffic.

Furthermore, although conventional visual warning displays are intended to alert on-coming traffic of the presence of the parked vehicle, they do not alert the workers outside of the parked vehicle that on-coming traffic is approaching. A worker concentrating on the job at hand may not be aware that an oncoming vehicle is approaching too close for safety as it passes by.

Thus there is a need for an improved motor vehicle warning system that better informs on-coming traffic of the presence of the parked vehicle and in turn alerts workers near the parked vehicle that nearby on-coming traffic is approaching.

SUMMARY OF THE DISCLOSURE

Disclosed is a motor vehicle warning system for use with a stationary motor vehicle that better informs on-coming traffic of the presence of the stationary motor vehicle and in turn alerts outside workers near the stationary motor vehicle that nearby on-coming traffic is approaching.

A warning system in accordance with the present disclosure includes a warning arm assembly and a proximity warning assembly.

The warning arm assembly includes an arm drive, a warning arm, and warning lights mounted on the warning arm. The arm drive is attached to the motor vehicle body, and may, for example, be mounted on a bumper of the motor vehicle body. The warning arm is pivotally mounted to the arm drive attached to the motor vehicle body. The arm drive may be attached to the motor vehicle body during manufacture of the motor vehicle or may be attached to the motor vehicle body as an aftermarket add-on.

The warning arm is pivotable by the arm drive about a pivot axis between a stowed or retracted position and an extended position. The warning arm when in the retracted position faces and extends along one side of the vehicle body, and when in the extended position extends away from the passenger side or driver side of the vehicle body.

The proximity warning assembly includes a proximity sensor and an audio generator. The proximity sensor is configured and disposed to detect an on-coming motor vehicle approaching the proximity sensor. The proximity sensor is operably connected to the audio generator whereby the audio generator produces an audible warning detectable from outside of the stationary motor vehicle when the proximity sensor detects an on-coming motor vehicle that is within a distance from or estimated seconds of arrival to the proximity sensor.

The proximity sensor may in embodiments determine the speed of the oncoming vehicle. In possible embodiments of the proximity warning assembly the frequency and/or the volume of audio warning generated by the audio generator may increase as the on-coming motor vehicle approaches the proximity sensor or may be a function of the speed of the on-coming motor vehicle.

Embodiments of the vehicle warning system may include a camera being configured and disposed to record video of on-coming motor vehicle traffic. In possible embodiments of the vehicle warning system the camera starts recording in response to the proximity sensor detecting an on-coming motor vehicle and does not record if no on-coming motor vehicles are detected.

In embodiments of the vehicle warning system the proximity sensor, the audio generator, and the camera (if included) are mounted on the warning arm. In other embodiments of the vehicle warning system the proximity sensor, and/or the audio generator and/or the camera (if included) are not mounted on the warning arm but are configured to be fixedly attached or connected to the motor vehicle body.

The warning arm may also include reflectors. The reflectors may be located with the lights on one side of the warning arm, or some or all of the reflectors may be located on a side of the warning arm opposite of the lights. When the warning arm is in the retracted position some or all of the reflectors may face outwardly away from the motor vehicle body.

A warning system may be mounted on a front side or rear side of the motor vehicle body. The warning arm may pivot 180 degrees from the retracted or retracted position to the extended position or active position to extend away from the driver side or passenger side of the motor vehicle body and to extend partially into an adjacent traffic lane.

Alternatively, a warning system may be mounted on a driver side or passenger side of the motor vehicle body. The warning arm may pivot 90 degrees from the retracted position to the extended position to extend away from the drive side or passenger side.

The warning arm in possible embodiments may extend outwardly from about 48 inches and 72 inches from the driver side or passenger side when in the extended position.

The disclosed warning system, including the arm drive, proximity sensor, lights, audio generator, camera (if present) and interconnecting circuitry and processor(s) may be powered by the motor vehicle battery.

Controls may be included in the passenger compartment to selectively energize and de-energize the warning system. A display monitor to view live or recorded video form the video camera may also be included.

When energized, the warning arm may automatically move from its retracted position to its extended position to extend into an adjacent lane of traffic and alert on-coming vehicles of the stationary motor vehicle. The extended warning arm forces motor vehicles in the adjacent traffic lane to move around the warning arm and space themselves away from the stationary motor vehicle.

The warning arm may be configured to break away easily from the arm drive if struck by an on-coming motor vehicle, minimizing damage to the striking motor vehicle and to the remainder of the warning system.

A motor vehicle employing the disclosed warning system may have only one warning system attached to the motor vehicle, or may have two or more warning systems attached to the motor vehicle.

For example, a motor vehicle that normally stops on the right side of the road may have only one warning system attached to the rear side of the motor vehicle in which the warning arm extends outwardly away from the driver side of the motor vehicle when in the extended positon.

Another motor vehicle may have a pair of warning systems, one attached to the front side of the vehicle and one attached to the rear side of the motor vehicle. One warning extends outwardly away from the driver side and the other warning arm extends outwardly from the passenger side when the warning arms are in the extended positions. Other motor vehicles may have warning systems attached to front and/or rear sides and to driver and/or passenger sides.

A motor vehicle may include a pair of warning systems on the front or rear sides of the motor vehicle vertically spaced apart from one another. The warning systems can be used singly or both at the same time. One warning arm extends outwardly away from the driver side and the other warning arm extends outwardly away from the passenger side. Depending on the surrounding traffic lanes, the warning systems can be used together for on-coming traffic moving in the same direction on both the passenger side and driver side of the stationary motor vehicle.

Other objects and features of the disclosure will become apparent as the description proceeds, especially when taken in conjunction with the accompanying drawing sheets illustrating one or more illustrative embodiments.

DETAILED DESCRIPTION

Figure 1:
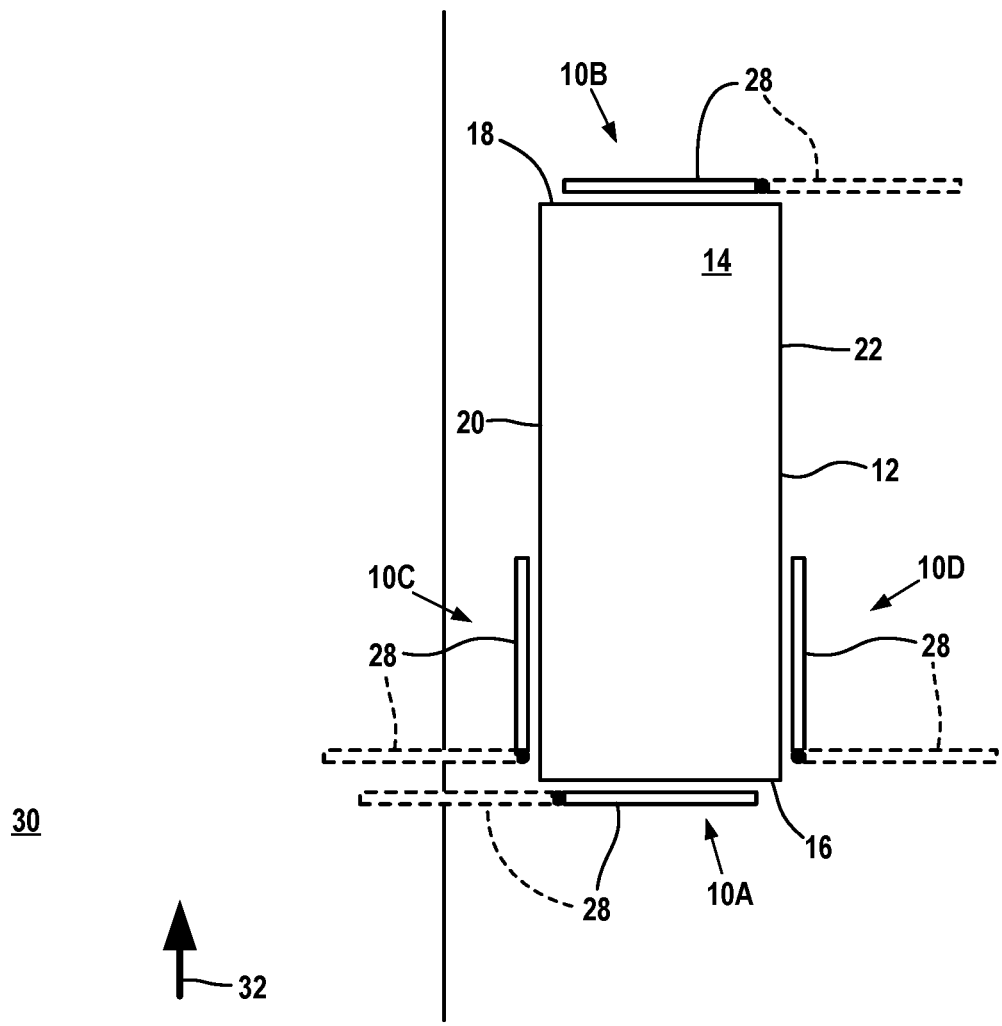
FIG. 1 is a top view of a motor vehicle having four warning systems in accordance with this disclosure, the motor vehicle parked to the side of a traffic lane.

FIG. 1 illustrates four warning systems 10A-10D in accordance with this disclosure attached to a motor vehicle body 12 defining the outside of a motor vehicle 14. The motor vehicle body may include a front bumper and a rear bumper. The motor vehicle 14 may be a police vehicle, a construction vehicle, an ambulance, or other motor vehicle that normally stops in or along a roadway for a worker or workers to work near the stationary motor vehicle.

The warning system 10A is attached to a rear side 16 of the motor vehicle body 12. The warning system 10B is attached to a front side 18 of the motor vehicle body 12. The warning system 10C is attached to a driver side 20 of the motor vehicle body 12. The warning system 10D is attached to a passenger side 22 of the motor vehicle body 12.

In the illustrated embodiment each of the warning systems 10 are powered by the battery (not shown) of the motor vehicle 14. In other embodiments a warning system 10 may be provided with its own battery or other power source that is independent of the vehicle battery.

Each warning system 10 includes a warning arm assembly 24 and a proximity warning assembly 26 (see FIGS. 2A and 2B), both assemblies discussed in more detail below. The warning arm assembly 24 includes a warning arm 28 that pivots from a retracted position shown in dashed lines in FIG. 1 facing and extending alongside a side of the motor vehicle body 12 to an extended position shown in solid lines in FIG. 1 extending away from the driver side or passenger side of the motor vehicle body.

The warning arm 28 is placed in its extended position when the motor vehicle 14 is stationary to alert on-coming vehicles of the presence of the stationary vehicle. In FIG. 1, the motor vehicle 14 is shown parked adjacent to a traffic lane 30 with on-coming vehicles approaching the motor vehicle 14 in the direction of the arrow 32. The warning arm 28 of the warning system 10A pivots 180 degrees from the retracted position along the vehicle rear side 16 to an extended position in which the warning arm extends outwardly beyond vehicle driver side 20 and partially into the lane 30. The warning arm 28 of the warning system 10C pivots 90 degrees from its retracted position along the vehicle drive side 20 to an extended position in which the warning arm extends outwardly behind vehicle driver side 20 and partially into the lane 30

In the illustrated embodiment a warning arm 28 extends outwardly away from a driver side or passenger side of the motor vehicle body about between 48 inches and 72 inches when in the extended position.

The warning arm 28 of the warning system 10A is designed to pivot about a pivot axis adjacent the driver side 20 of the motor vehicle body 12 in order to extend away from the driver side when in the extended position. Alternatively, the warning arm 29 of the warning system 10A can be designed to pivot about a pivot axis adjacent to the passenger side 22 of the motor vehicle body 12 in order to extend away from the passenger side when in the extended position. A similar change of the pivot axis to the other end of the warning arm can be made for the other warning systems 10B, 10C, 10D.

The location of the warning systems 10C, 10D between the front side 18 and the rear side 16 of the motor vehicle body 12 can also be selected differently as shown depending on vehicle configuration and desired positioning of the extended warning arm along the side of the motor vehicle body.

Figure 2A:
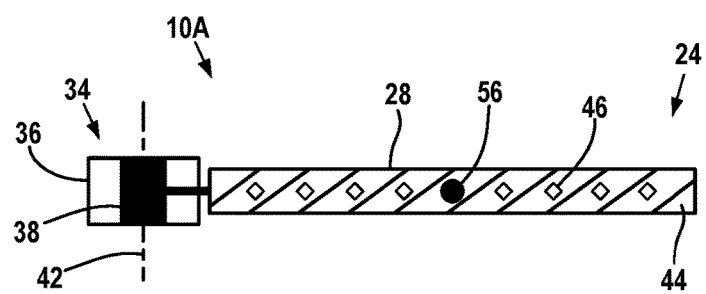
FIG. 2A and FIG. 2B are elevation views of a warning system shown in FIG. 1 with the warning arm in the retracted and extended positions respectively.
Figure 2B:
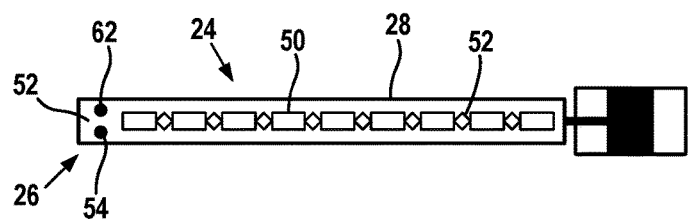

FIGS. 2A and 2B illustrate the warning system 10A. FIG. 2A illustrates the warning system 10A with the warning arm 28 in the retracted position. FIG. 2B illustrates the warning system 10A with the warning arm in the extended position.

Both figures are views looking from behind the motor vehicle 14 in the direction of the arrow 32 (see FIG. 1).

The warning system 10A includes the warning arm assembly 24 and the proximity warning assembly 26. The warning arm assembly alerts on-coming motor vehicles of the presence of the stationary motor vehicle 14. The proximity warning assembly 26 alerts workers outside of the motor vehicle 14 to the presence of on-coming traffic.

The warning arm assembly 24 includes the warning arm 28, an arm drive 34, and lights and reflectors mounted on the warning arm.

The arm drive 34 includes an actuator housing 36 that houses an electric motor 38. In the illustrated embodiment the actuator housing 36 is mounted on a back bumper of the motor vehicle 14. The actuator housing can be configured to be mounted on the bumper as an after-market part or can be installed on the rear side of the motor vehicle during manufacture of the motor vehicle body 12.

An end portion of the warning arm 28 is attached to the electric motor 38 to be driven by the electric motor about a pivot axis 42. An example of an arm drive that can be adapted for use with the present disclosure is disclosed in Lampeter, U.S. Pat. No. 6,234,105 which is incorporated by reference herein.

The illustrated warning arm 28 is a generally elongate member of rectangular cross section that remains parallel with the ground when moving between retracted and extended positions. The warning arm may be made of ABS plastic, PVC plastic, or a lightweight metal framework. The warning arm may be supported by brackets (not shown) attached to the motor vehicle body 12 to support the warning arm if loaded with snow or ice during inclement weather. The warning arm will include shear points or other "lines of weakness" to easily break away from the arm drive 34 should the warning arm be struck by an on-coming motor vehicle when in the extended position.

When the warning arm 28 is in the retracted position shown in FIG. 2A, a first side 44 of the warning arm 28 faces away from the rear side 16 of the motor vehicle body 12 and towards on-coming traffic moving in the direction 32. A first set of reflectors 46 are mounted on the first arm side 44 to reflect back the headlights of on-coming traffic and help alert the on-coming traffic to the presence of the motor vehicle 14. The first side 44 can also be painted with reflective paint, present stripes or other patterns to attract the attention of on-coming drivers, or the like.

When the warning arm 28 is in the extended position shown in FIG. 2B, a second side 48 of the warning arm opposite from the first side 44 faces towards on-coming traffic moving in the direction 32. Lights 50 are mounted on the second side 48 of the warning arm 28. The lights 50 may be LED lights, incandescent lights, or the like and are energized when the warning arm 28 is in its extended position. The lights 50 may remain at a constant intensity, may pulse, or may flash to attract the attention of on-coming motorists.

The illustrated warning arm 28 further includes a second set of reflectors 52 on the warning arm's second side 48. The second set of reflectors 52 are present to alert on-coming motorists of the extended warning arm 28 should the lights 50 fail for whatever reason.

The proximity warning assembly 26 includes a proximity sensor 54 and an audio generator 56 operatively connected to the proximity sensor. In the illustrated embodiment the proximity sensor 54 and the audio generator 56 are both mounted to the warning arm 28.

The proximity sensor 54 is a long-range sensor which measures a region or area ahead of the sensor for the presence and relative speed of a motor vehicle towards the proximity sensor within the region or area ahead of the vehicle. Such proximity sensors may use laser, infrared, acoustics, radar, or other sensing technology. Such sensors are used in the motor vehicle industry for adaptive cruise control (ACC) and autonomous vehicles, and are used in, for example, warning displays in work zones to display to the driver of an on-coming vehicle the speed of the vehicle. A commercially available radar proximity sensor for example may have a range of over 300 yards with an approximately 18 degree field of view.

The proximity sensor 54 is mounted on the warning arm 28 to sense an area extending away from the warning side second side 48 and towards the on-coming traffic.

The audio generator 56 may be a siren or loudspeaker that outputs an audible warning when the proximity sensor 54 detects an oncoming vehicle.

Figure 3:
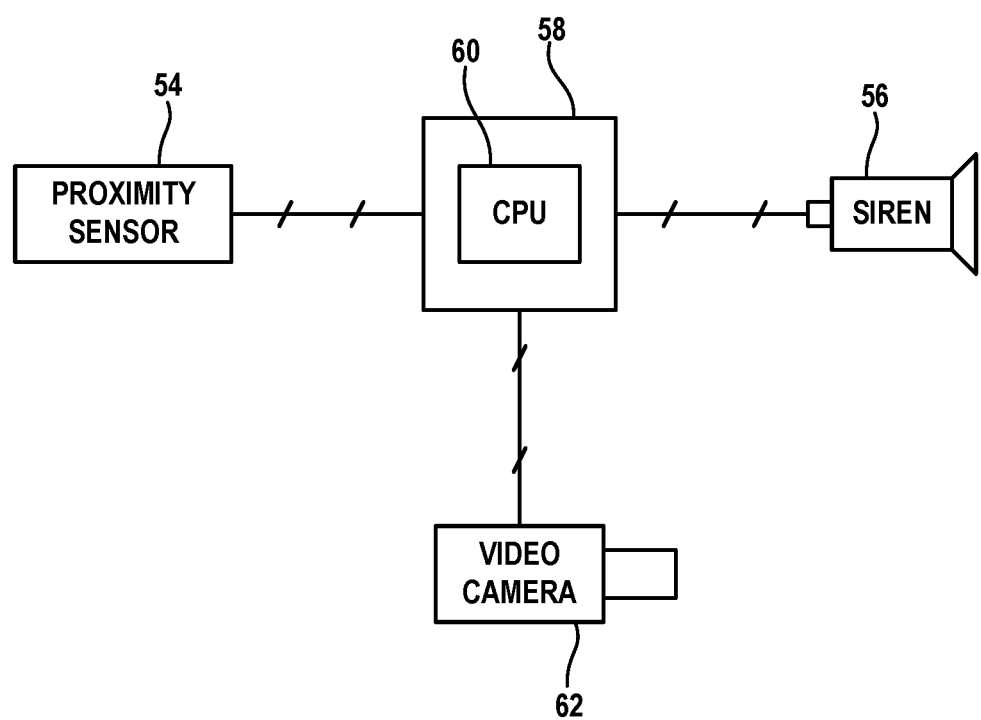
FIG. 3 is a schematic diagram of a control network of the warning system shown in FIG. 2A.

As shown in FIG. 3, the warning system 10A may include a controller 58 having a computer processor 60. The controller 58 receives a data from the proximity sensor 54 representing the presence and speed of an on-coming motor vehicle. When the on-coming vehicle is sufficiently close to the motor vehicle 14 or is approaching at a high rate of speed, the computer processor 60 acts to cause the audio generator 56 emit an audible warning of an on-coming vehicle. In embodiments the volume or frequency of the audible warning may increase as the on-coming motor vehicle approaches the proximity sensor 54, or may have a volume or frequency that is a function of the speed of the on-coming vehicle (for example, the faster the on-coming vehicle, the louder the audio alarm and/or the more high-pitched the alarm). The computer processor 60 then shuts off the audio generator 56 after the on-coming vehicle passes the motor vehicle 14.

The illustrated warning system 10A also includes a video camera 62 mounted on the warning arm 28 that has a field of view overlapping the field of view of the proximity sensor 54 to record on-coming traffic. The video camera 62 may record continuously while the warning arm 28 is in the extended position.

Alternatively, the camera 62 may be connected to the computer processor 60 as shown in FIG. 3 to turn on only if a motor vehicle is approaching or if a motor vehicle is approaching at above a speed, and then turn off once the on-coming motor vehicle passes the motor vehicle 14.

The video output of the video camera 62 may be stored in a tangible storage medium included as part of the warning system 10A or, where appropriate, is streamed wirelessly from the warning system 10A to remote or cloud storage. Continuous video output may be written to memory or transmitted to memory continuously, or the video output may be written or stored only while an on-coming motor vehicle is being detected.

In possible embodiments a video camera 62 with built-in motion detection can combine the function of the proximity sensor and the video camera 62, that is, function as both the proximity sensor and the camera. Motion detection cameras are commonly used for security surveillance systems and can be adapted for use with the disclosed warning system. An example of a security surveillance camera that can be adapted for use with the disclosed warning system is the Arlo ULTRA™ manufactured by Arlo Technologies, Inc., San Jose, Calif.

The proximity sensor 54, audio generator 56, and video camera 62 may be input/output devices connected to the controller 58 to form a network as shown in FIG. 3. The network, in possible embodiments, could conform to the Controller Area Network (CAN) bus protocol or other control network protocol.

In other possible embodiments of the warning system 10, the proximity sensor 54, and/or the audio generator 56, and/or the video camera 62 may be attached to the motor vehicle body 12 and not mounted on the warning arm 28. For example, the proximity sensor, audio generator, and video camera may be mounted in or on the actuator housing 38 which in turn is attached to the motor vehicle body 12. Loss of the warning arm would not cause loss of the proximity sensor, audio generator, and video camera.

In yet other possible embodiments of the warning system 10, the camera 62 and/or the proximity sensor 54 may be shared between multiple warning systems 10A, 10B, . . . 10N on a common network and having a common controller 58. The camera or proximity sensor can be movably mounted to the motor vehicle body 12 and the "aim" of the camera or proximity sensor set by the controller 58 as required for the warning system 10 upon the warning system being energized. For example, the camera 62 may be mounted on the roof or top side of the motor vehicle and points towards the front or back of the motor vehicle depending on which warning system is active.

The illustrated motor vehicle 14 has four warning systems 10 to provide worker protection from on-coming motor vehicles approaching from the front of the motor vehicle, approaching from the rear of the motor vehicle, approaching along the driver side of the motor vehicle, or approaching along the passenger side of the motor vehicle. Motor vehicles 14 can be provided with fewer warning systems 10 if more limited worker protection is acceptable. For example, if on-coming traffic would always be approaching from the rear and passenger sides of the motor vehicle, only a single warning system 10 could be provided mounted on the rear side or passenger side of the motor vehicle.

Figure 4A:
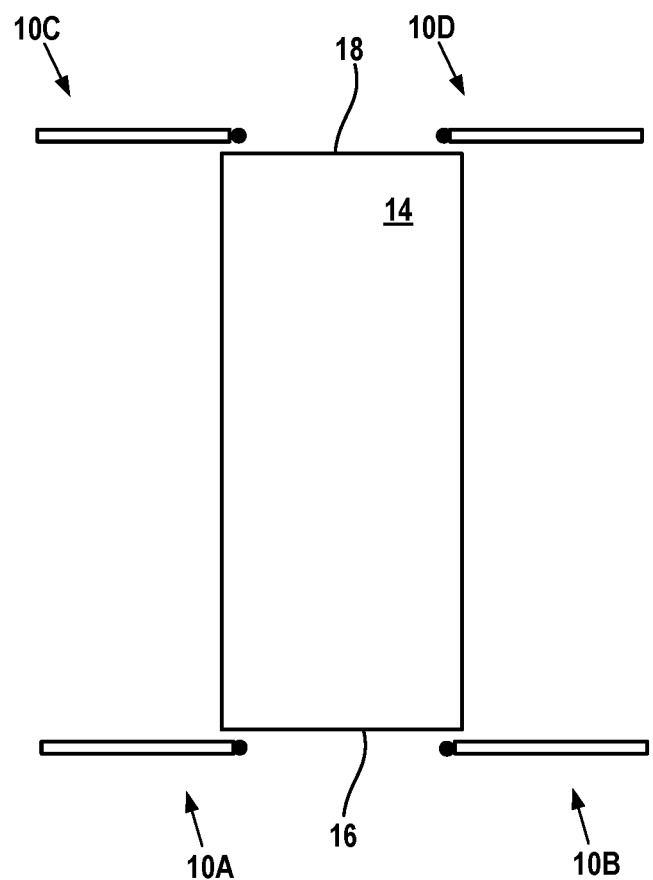
FIG. 4A and FIG. 4B are similar to FIG. 1 but illustrate alternative mounting configurations of multiple warning systems on the motor vehicle.
Figure 4B:
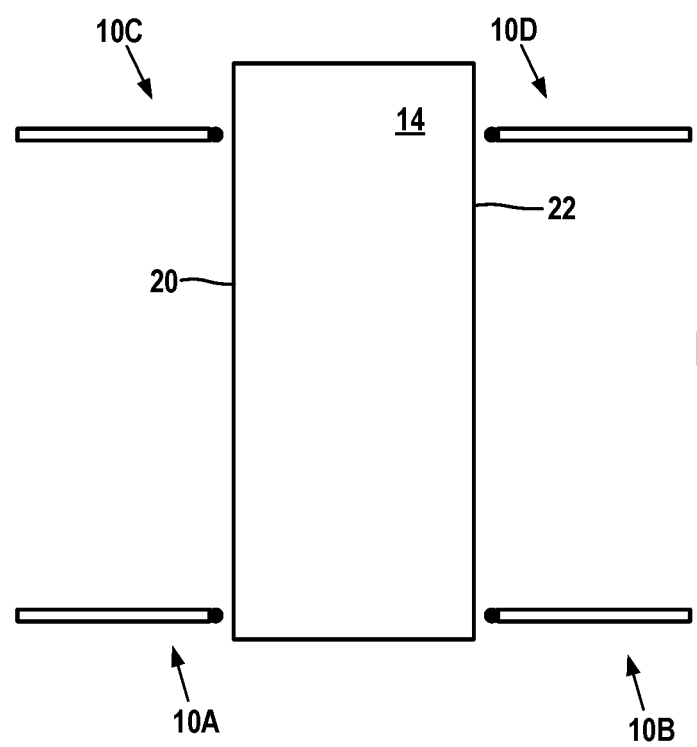

FIGS. 4A and 4B illustrate the motor vehicle 14 having different mounting configurations of the warning systems 10 (the warning arms are shown in their extended positions).

In FIG. 4A, a first pair of warning systems 10A, 10B are mounted on the rear side 16 of the motor vehicle 14 and a second pair of warning system 10C, 10D are mounted on the front side 18 of the motor vehicle 14. The warning arms 28 of each pair of warning systems 10 are vertically spaced from one another for independent operation of each warning system of the pair, and extend in opposite directions when the warning systems are energized. The front pair of warning systems 10C, 10D are configured to sense on-coming motor vehicles approaching from the front side of the motor vehicle and the rear pair of warning systems 10A, 10B are configured to sense on-coming motor vehicles approaching from the rear side of the motor vehicle.

In FIG. 4B, a first pair of warning systems 10A, 10B are mounted on the driver side 20 of the motor vehicle 14 and a second pair of warning systems 10C, 10D are mounted on the passenger side 22 of the motor vehicle 14. The driver side warning systems 10A, 10B are configured to sense on-coming traffic passing the driver side 20 of the motor vehicle approaching from the front side 18 and the rear side 16 of the motor vehicle 14 respectively. The passenger side warning systems 10C, 10D are configured to sense on-coming traffic passing the passenger side 22 of the motor vehicle 14 approaching from the front side 18 and the rear side 16 of the motor vehicle 14 respectively.

While this disclosure includes one or more illustrative embodiments described in detail, it is understood that the one or more embodiments are each capable of modification and that the scope of this disclosure is not limited to the precise details set forth herein but include such modifications that would be obvious to a person of ordinary skill in the relevant art including (but not limited to) changes in material selection, size, operating ranges, environment of use, number and arrangement of warning systems, and the like, as well as such changes and alterations that fall within the purview of the following claims.

What is claimed is:

1. A motor vehicle comprising:
a vehicle body and a vehicle warning system attached to the vehicle body;
the vehicle body comprising a front side, a back side, a driver side, and a passenger side, the driver and passenger sides extending between the front and back sides;
the vehicle warning system comprising a warning arm assembly and a proximity warning assembly;
the warning arm assembly comprising an arm drive, a warning arm, and warning lights mounted on the warning arm;
the arm drive attached to the chassis, the warning arm being pivotally mounted to the arm drive, the warning arm being pivotable by the arm drive about a pivot axis between a retracted position and an extended position of the warning arm, the warning arm when in the retracted position facing and extending along one side of the vehicle body, the warning arm when in the extended position extending away from the one side;
the proximity warning assembly comprising a proximity sensor and an audio generator, the proximity sensor being disposed to detect a motor vehicle approaching the proximity sensor, the proximity sensor being a long-range sensor capable of detecting an on-coming motor vehicle more than 100 yards away from the proximity sensor and determining the speed of the on-coming motor vehicle, the proximity sensor operably connected to the audio generator whereby the audio generator produces an audible warning detectable from outside of the motor vehicle when the proximity sensor detects an on-coming motor vehicle that is within a range or distance from the proximity sensor or is approaching above a predetermined speed.

2. The motor vehicle of claim 1 wherein the vehicle warning system comprises a camera being configured and disposed to record video of on-coming motor vehicle traffic.

3. The motor vehicle of claim 2 wherein the camera is configured to start recording in response to the proximity sensor detecting an on-coming motor vehicle.

4. The motor vehicle of claim 2 wherein the camera is mounted on the warning arm.

5. The motor vehicle of claim 2 comprising a video camera with motion detection capability, wherein the video camera with motion detection capability comprises the video camera and the proximity sensor.

6. The motor vehicle of claim 1 wherein the audio generator is mounted on the warning arm.

7. The motor vehicle of claim 1 wherein the warning arm comprises opposite sides extending a length of the warning arm, the lights on one side of the warning arm, and reflectors on one or both sides of the warning arm.

8. The motor vehicle of claim 1 wherein the warning arm comprises a side extending a length of the warning arm, the lights and at least one reflector mounted on the side of the warning arm.

9. The motor vehicle of claim 6 wherein the warning arm comprises opposite sides extending a length of the warning arm, the lights are on one side of the warning arm, the reflectors comprising a first set of reflectors on the one side of the warning arm and a second set of reflectors on the other side of the warning arm.

10. The motor vehicle of claim 1 wherein at least some of the reflectors face outwardly away from the motor vehicle body when the warning arm is in the retracted position.

11. The motor vehicle of claim 1 wherein the proximity sensor and/or the audio generator are fixedly mounted to the vehicle body.

12. The motor vehicle of claim 1 wherein the warning arm is generally parallel with the ground when in the retracted position and when in the extended position.

13. The motor vehicle of claim 1 wherein the warning arm extends along the front side or the rear side of the motor vehicle when in the retracted position and pivots about 180 degrees when pivoting from the retracted position to the extended position.

14. The motor vehicle of claim 13 wherein the warning arm extends along the rear side of the motor vehicle body when in the retracted position.

15. The motor vehicle of claim 1 wherein the warning arm extends along the driver side or the passenger side of the motor vehicle body when in the retracted position and pivots about 90 degrees when pivoting from the retracted position to the extended position.

16. The motor vehicle of claim 1 wherein the warning arm extends away from the motor vehicle body by not less than 48 inches and not more than 72 inches when the warning arm is in the extended position.

17. The motor vehicle of claim 1 wherein the frequency and/or the volume of audio that is output by the audio generator in response to the proximity sensor detecting an oncoming motor vehicle increases as the on-coming motor vehicle approaches the proximity sensor.

18. The motor vehicle of claim 1 wherein the frequency and/or the volume of audio output by the audio generator in response to the proximity sensor detecting an oncoming motor vehicle is a function of the speed of the on-coming motor vehicle approaching the proximity sensor.

19. The motor vehicle of claim 1 wherein the warning system is a first warning system attached to a first side of the motor vehicle body and the motor vehicle comprises at least one additional warning system attached to a different side of the motor vehicle body.

20. The motor vehicle of claim 1 wherein the warning system is a first warning system attached to a first side of the motor vehicle body and the motor vehicle comprises an additional warning system attached to the first side of the motor vehicle body.

* * * * *